United States Patent [19]
Kobayashi et al.

[11] Patent Number: 5,665,915
[45] Date of Patent: Sep. 9, 1997

[54] SEMICONDUCTOR CAPACITIVE ACCELERATION SENSOR

[75] Inventors: Mitsuo Kobayashi; Katsumichi Ueyanagi, both of Kanagawa, Japan

[73] Assignee: Fuji Electric Co., Ltd., Kanagawa, Japan

[21] Appl. No.: 281,100

[22] Filed: Jul. 27, 1994

Related U.S. Application Data

[63] Continuation-in-part of Ser. No. 36,697, Mar. 25, 1993, abandoned.

[30] Foreign Application Priority Data

| Mar. 25, 1992 | [JP] | Japan | 4-066470 |
| Aug. 27, 1992 | [JP] | Japan | 4-227651 |
| Jul. 28, 1993 | [JP] | Japan | 5-185828 |

[51] Int. Cl.⁶ ............................................. G01P 15/125
[52] U.S. Cl. ..................................... 73/514.32; 73/514.18
[58] Field of Search .......................... 73/517 R, 517 AV, 73/510, 514, 514.32, 514.18

[56] References Cited

U.S. PATENT DOCUMENTS

| 4,129,042 | 12/1978 | Rosvold | 73/517 R |
| 4,522,072 | 6/1985 | Sulouff et al. | 73/517 R |
| 4,553,436 | 11/1985 | Hansson | 73/517 R |
| 4,641,539 | 2/1987 | Vilimek | 73/517 R |
| 4,732,647 | 3/1988 | Aine | 156/633 |
| 4,893,509 | 1/1990 | MacIver et al. | 73/517 |
| 5,115,291 | 5/1992 | Stokes | 73/517 R |
| 5,134,881 | 8/1992 | Henrion et al. | 73/517 R |
| 5,223,086 | 6/1993 | Terada et al. | 73/517 R |
| 5,228,341 | 7/1993 | Tsuchitani et al. | 73/517 R |
| 5,233,213 | 8/1993 | Marek | 73/517 R |
| 5,249,465 | 10/1993 | Bennett et al. | 73/514.32 |
| 5,251,485 | 10/1993 | Kondo | 73/517 R |
| 5,365,768 | 11/1994 | Suzuki et al. | 73/517 R |
| 5,381,300 | 1/1995 | Thomas et al. | 73/517 R |

FOREIGN PATENT DOCUMENTS

| 0 171 056 | 2/1986 | European Pat. Off. . |
| 0 368 446 A2 | 5/1990 | European Pat. Off. . |

(List continued on next page.)

OTHER PUBLICATIONS

"A Review of Low cost Accelerometers for Vehicle Dynamics", G.A. MacDonald, Sensors and Actuators, A21–A23 (1990), pp. 303–307.

"Micromachined Sensors for Automotive Applications", W. Dunn, Sensors, (1991), p. 54–63.

"A Capacitive Type Accelerometers with Self-Test Feature Based on a Double-pinned Polysilicon Structure", Lj. Ristic et al, The 7th International Conference on Solid-State Sensors and Actuators, pp. 810–813.

*Primary Examiner*—Hezron E. Williams
*Assistant Examiner*—Helen C. Kwok
*Attorney, Agent, or Firm*—Finnegan, Henderson, Farabow, Garrett & Dunner, L.L.P.

[57] ABSTRACT

A semiconductor capacitive acceleration sensor is configured so that it can be constructed in a small size, it has a high detection sensitivity, and the detection output characteristic is linear. The sensor comprises a semiconductor substrate 1; supporters 21A to 21D each of which is made of a conductive semiconductor, and which are disposed on the upper face of the semiconductor substrate 1 through an insulating layer 1A so as to be placed at positions corresponding to corners of a quadrilateral; beams 26A to 26D which respectively have ends connected with the supporters, which coincide with each other when the beams are rotated, and which elongate in the side directions of the quadrilateral; a movable electrode 23 which has a quadrilateral shape, and which is disposed so as to be separated from the beams by a predetermined distance; connectors 27A to 27D which respectively connect the movable electrode 23 with the beams; and a stationary electrode 31 which is disposed so as to be separated from the lower face of the movable electrode 23 by a predetermined distance.

11 Claims, 6 Drawing Sheets

FOREIGN PATENT DOCUMENTS

| | | |
|---|---|---|
| 0 395 922 | 11/1990 | European Pat. Off. . |
| 0 492 986 A2 | 7/1992 | European Pat. Off. . |
| 0547742A1 | 6/1993 | European Pat. Off. . |
| 3922476A1 | 1/1991 | Germany . |
| 4022464A1 | 1/1992 | Germany . |
| 56-142429 | 11/1981 | Japan . |
| 4-225166 | 8/1992 | Japan . |
| 4-269659 | 9/1992 | Japan . |
| 4-299267 | 10/1992 | Japan . |

SEMICONDUCTOR CAPACITIVE ACCELERATION SENSOR

This application is a continuation-in-part of U.S. Ser. No. 08/036,697 filed on Mar. 25, 1993, abandoned in favor of continuation application, Ser. No. 08/376,051, filed Jan. 23, 1995.

BACKGROUND OF THE INVENTION

This invention relates to a microminiature semiconductor capacitive acceleration sensor which detects, for example, an acceleration state, a joggling state of an automobile and processes a detected signal so as to be used in various controls.

A technique has been developed in which a silicon layer made of, for example, polysilicon, and a sacrifice layer made of, for example, PSG (Phospho Silicate Glass) are formed so as to constitute a multilayer structure, the multilayer structure is processed by a micromachinning technique, and then the sacrifice layer is removed away by hydrofluoric acid or the like. Hereinafter, this technique is referred to as "multilayer micromachinning technique". A microminiature semiconductor capacitive acceleration sensor has been developed with using such a technique.

FIG. 5 is a perspective view showing an example of a conventional semiconductor capacitive acceleration sensor which is produced with using the multilayer micromachinning technique. The sensor comprises: a semiconductor substrate 1; a supporter 21 which is made of polysilicon and disposed on the upper face of the semiconductor substrate 1 through an insulating layer 1A made of silicon oxide or the like; beams 22A and 22B each of which has one end perpendicularly connected with the supporter 21, which horizontally elongate in parallel, and which have the same length; a movable electrode 23 which is connected with the other ends of the beams 22A and 22B, and which horizontally elongate; a stationary electrode 31 which is disposed on the upper face of the silicon substrate 1 through the insulating layer 1A, so as to be separated from the lower face of the movable electrode 23 by a predetermined distance; supporters 42A and 42B which are disposed on the upper face of the silicon substrate 1 through the insulating layer 1A; and a stationary electrode 41 which is connected at the periphery with the supporters 42A and 42B, and which is disposed so as to be separated from the upper face of the movable electrode 23 by a predetermined distance. A terminal M is drawn out from the movable electrode 23 through the beams 22A and 22B and the supporter 21, a terminal $S_1$ from the stationary electrode 31, and a terminal $S_2$ from the stationary electrode 41 through the supporter 42B.

The polysilicon is doped with an impurity so that the specific resistance is reduced to, for example, about 1 $\Omega$cm or the polysilicon is conductive. It is a matter of course that single crystal silicon which is doped with an impurity so as to become conductive may be used in place of polysilicon. However, a sensor using polysilicon can be produced at a lower cost than that using single crystal silicon (this is also applicable to the sensors described below).

The semiconductor capacitive acceleration sensor operates in the following manner: When acceleration is applied to the movable electrode 23 in the vertical direction, the movable electrode 23 receives a force in the vertical direction so that the beams 22A and 22B is bent while their ends connected with the supporter 21 function as fulcrums, whereby the movable electrode 23 is rotated in one of the directions of arrows P. For example, the rotation of the movable electrode 23 causes the distance between the movable electrode 23 and the stationary electrode 31 to be reduced, thereby increasing the electrostatic capacity between the electrodes, and, in contrast, the distance between the movable electrode 23 and the stationary electrode 41 to be increased, thereby decreasing the electrostatic capacity between the electrodes. The values of these electrostatic capacities are respectively obtained through the terminals M and $S_1$, and M and $S_2$, and then subjected to a signal processing by a differential amplifier or the like, thereby detecting the applied acceleration.

FIG. 6 is a perspective view showing another example of a conventional semiconductor capacitive acceleration sensor which is similarly produced with using the multilayer micromachinning technique. The sensor comprises: a semiconductor substrate 1; a supporter 21 which is made of polysilicon and disposed on the upper face of the semiconductor substrate 1 through an insulating layer 1A; a beam 24A which has one end connected with the supporter 21, and which horizontally elongates; a beam 24B which has one end connected with the supporter 21, which has the same length as the beam 24A, and which is oppositely directed; and a movable electrode 23 which horizontally elongates. The movable electrode 23 has a rectangular window which is sifted from the center of gravity of the electrode in one lateral direction, for example, the rightward direction. The other ends of the beams 22A and 22B are respectively connected with the sides of the window which are in the longitudinal direction of the window. The sensor further comprises: a stationary electrode 31 which is disposed on the upper face of the silicon substrate 1 through the insulating layer 1A, so as to be separated from one side portion of the lower face of the movable electrode 23 with respect to the beams 24A and 24B (in FIG. 6, the left portion of the lower face) by a predetermined distance; and a stationary electrode 41 which is disposed on the upper face of the silicon substrate 1 through the insulating layer 1A, so as to be separated from the other portion of the lower face of the movable electrode 23 (i.e., the right portion of the lower face) by a predetermined distance. A terminal M is drawn out from the movable electrode 23 through the beam 24A (24B) and the supporter 21, a terminal $S_1$ from the stationary electrode 31, and a terminal $S_2$ from the stationary electrode 41.

The semiconductor capacitive acceleration sensor operates in the following manner: When acceleration is applied to the movable electrode 23 in the vertical direction, the right and left portions of the movable electrode 23 receive forces in the vertical direction, respectively. Since the left portion is heavier than the right portion, the beams 24A and 24B are twisted while their ends connected with the supporter 21 function as fulcrums, whereby the movable electrode 23 is rotated in one of the directions of arrows Q. For example, the rotation of the movable electrode 23 causes the distance between the movable electrode 23 and the stationary electrode 31 to be reduced, thereby increasing the electrostatic capacity between the electrodes, and, in contrast, the distance between the movable electrode 23 and the stationary electrode 41 to be increased, thereby decreasing the electrostatic capacity between the electrodes. The values of these electrostatic capacities are respectively obtained through the terminals M and $S_1$, and M and $S_2$, and then subjected to a signal processing by a differential amplifier or the like, thereby detecting the applied acceleration.

FIG. 7 is a perspective view showing a further example of a semiconductor capacitive acceleration sensor of the prior art which is similarly produced with using the multilayer micromachinning technique. The sensor comprises: a semiconductor substrate 1; supporters 21A and 21B each of which is made of polysilicon and disposed on the upper face of the semiconductor substrate 1 through an insulating layer 1A; beams 24A and 24B which respectively have ends connected with the supporters 21A and 21B, and which elongate horizontally opposingly; a movable electrode 23 which is connected between the other ends of the beams 24A and 24B, and which horizontally elongates; a stationary electrode 31 which is disposed on the upper face of the silicon substrate 1 through the insulating layer 1A, so as to be separated from one side portion of the lower face of the movable electrode 23 with respect to the beams 24A and 24B (in FIG. 7, the rear portion of the lower face) by a predetermined distance; and a stationary electrode 41 which is disposed on the upper face of the silicon substrate 23 through the insulating layer 1A, so as to be separated from the other portion of the lower face of the movable electrode 23 (i.e., the front portion of the lower face) by a predetermined distance. A terminal M is drawn out from the movable electrode 23 through the beam 24A and the supporter 21A, a terminal $S_1$ from the stationary electrode 31, and a terminal $S_2$ from the stationary electrode 41. The reference numeral 25 designates a weight connected with the rear portion of the movable electrode 23.

The semiconductor capacitive acceleration sensor operates in the following manner: When acceleration is applied to the movable electrode 23 in the vertical direction, the rear and front portions of the movable electrode 23 receive forces in the vertical direction, respectively. Since the rear portion is heavier than the front portion, the beams 24A and 24B are twisted while their ends connected with the supporters 21A and 21B function as fulcrums, whereby the movable electrode 23 is rotated in one of the directions of arrows R. For example, the rotation of the movable electrode 23 causes the distance between the movable electrode 23 and the stationary electrode 31 to be reduced, thereby increasing the electrostatic capacity between the electrodes, and, in contrast, the distance between the movable electrode 23 and the stationary electrode 41 to be increased, thereby decreasing the electrostatic capacity between the electrodes. The values of these electrostatic capacities are respectively obtained through the terminals M and $S_1$, and M and $S_2$, and then subjected to a signal processing by a differential amplifier, etc., thereby detecting the applied acceleration.

FIGS. 8A and 8B show a still further example of a semiconductor capacitive acceleration sensor of the prior art which is similarly produced with using the multilayer micromachinning technique. FIG. 8A is a perspective view, and FIG. 8B is a sectional view along the line C—C of FIG. 8A. The sensor comprises: a semiconductor substrate 1; supporters 21A to 21D each of which is made of polysilicon, and which are disposed on the upper face of the semiconductor substrate 1 through an insulating layer 1A so as to be placed at positions corresponding to corners of a quadrilateral; beams 22A to 22D which respectively have ends connected with the respective supporters 21A to 21D, which coincide with each other when the beams are rotated by 90°, and which elongate in the diagonal directions of the quadrilateral; a movable electrode 23 which is connected with the other ends of the beams 22A to 22D; a stationary electrode 31 which is disposed on the upper face of the silicon substrate 1 through the insulating layer 1A, so as to be separated from the lower face of the movable electrode 23; supporters 42A and 42B which is disposed on the upper face of the silicon substrate 1 through the insulating layer 1A; and a stationary electrode 41 which is connected at a periphery with the supporters 42A and 42B, so as to be separated from one portion of the upper face of the movable electrode 23 (in FIGS. 8A and 8B, the left portion of the upper face) by a predetermined distance. A terminal M is drawn out from the movable electrode 23 through the beam 22A and the supporter 21B, a terminal $S_1$ from the stationary electrode 31, and a terminal $S_2$ from the stationary electrode 41 through the supporter 42A.

The semiconductor capacitive acceleration sensor operates in the following manner: When acceleration is applied to the movable electrode 23 in the vertical direction, the movable electrode 23 receives a force in the vertical direction to be moved vertically. For example, the vertical movement of the movable electrode 23 causes the distance between the movable electrode 23 and the stationary electrode 31 to be reduced, thereby increasing the electrostatic capacity between the electrodes, and, in contrast, the distance between the movable electrode 23 and the stationary electrode 41 to be increased, thereby decreasing the electrostatic capacity between the electrodes. The values of these electrostatic capacities are respectively obtained through the terminals M and $S_1$, and M and $S_2$, and then subjected to a signal processing by a differential amplifier, etc., thereby detecting the applied acceleration.

In the semiconductor capacitive acceleration sensors shown in FIGS. 5 to 7, when acceleration is applied, the movable electrode is rotated with respect to the stationary electrodes, and the changes of the electrode gaps caused by the rotation of the movable electrodes are detected as the changes of the electrostatic capacities. The amount of the rotation of the movable electrode is not proportional to that of each change of the electrode gap, thereby producing a problem in that the detection output characteristic is not linear. In the semiconductor capacitive acceleration sensor shown in FIGS. 8A and 8B, when acceleration is applied, the movable electrode is vertically moved with respect to the stationary electrode, and the changes of the electrode gaps caused by the vertical movement of the movable electrode are detected as the changes of the electrostatic capacities. The amount of the vertical movement of the movable electrode is proportional to that of each change of the electrode gap, so that detection output shows a liner characteristic. Since the movable electrode is supported by four short beams, however, there is a problem in that the amount of the vertical movement of the movable electrode is so small that the detection sensitivity is low (if the beams are lengthened as they are so as to solve this problem, the device size is increased). In the semiconductor acceleration sensor shown in FIGS. 8A and 8B, moreover, the one stationary electrode (designated by 31 in FIGS. 8A and 8B) and the other stationary electrode (designated by 41 in FIGS. 8A and 8B) which respectively produce electrostatic capacities changing in the manners contradictory to each other have different areas, and hence the values (absolute values) of the electrostatic capacities are different from each other. This causes the circuit for processing signals, for example, the differential amplifier to be complicated, thereby increasing the production cost.

SUMMARY OF THE INVENTION

It is an object of the invention to provide a semiconductor capacitive acceleration sensor which can be constructed in a small size, which has a high detection sensitivity, and in which the detection output characteristic is linear. In a sensor wherein electrostatic capacities respectively change in manners contradictory to each other, moreover, one stationary electrode and the other stationary electrode which respectively produce the electrostatic capacities changing in the manners contradictory to each other are configured so as to have a substantially same area.

In order to attain the object, the semiconductor capacitive acceleration sensor of the invention comprises: a semiconductor substrate; a plurality of supporters which are made of a conductive semiconductor and disposed on an upper face of the semiconductor substrate through an insulating layer, the supporters being placed at positions which correspond to corners of a regular polygon, respectively; beams which are respectively connected with the supporters at one end, and which elongate along sides of the regular polygon, the beams coinciding with each other when the beams are moved by rotation; a movable electrode which is disposed with being separated from the beams by a predetermined distance, the electrode having a shape of the regular polygon; connectors which connect the movable electrode with the other ends of the beams, respectively; and a stationary electrode which is disposed on the upper face of the semiconductor substrate through the insulating layer, the stationary electrode being separated from a lower face of the movable electrode by a predetermined distance.

Alternatively, the semiconductor capacitive acceleration sensor comprises: a semiconductor substrate; a plurality of supporters which are made of a conductive semiconductor and disposed on an upper face of the semiconductor substrate through an insulating layer, the supporters being placed at positions which correspond to corners of a regular polygon, respectively; beams which are respectively connected with the supporters at one end, and which elongate along sides of the regular polygon, the beams coinciding with each other when the beams are moved by rotation; a movable electrode which is disposed with being separated from the beams by a predetermined distance, the electrode having a shape of the regular polygon; connectors which connect the movable electrode with the other ends of the beams, respectively; a first stationary electrode which is disposed on the upper face of the semiconductor substrate through the insulating layer, the stationary electrode being separated from a lower face of the movable electrode by a predetermined distance; a plurality of supporters which are disposed on the upper face of the semiconductor substrate through the insulating layer; and a second stationary electrode which is connected at a periphery with the supporters, and which is separated from an upper face of the movable electrode by a predetermined distance.

It is more preferable that, in the semiconductor capacitive acceleration sensors, a metal film is attached to the movable electrode.

In the semiconductor capacitive acceleration sensor of the invention, the movable electrode has a regular polygonal shape, and is uniformly supported at the periphery by the plural beams which are respectively disposed in parallel to the sides of the regular polygon with being separated therefrom by a predetermined distance. When acceleration is applied in the vertical direction, the movable electrode is vertically moved with respect to the stationary electrode. The other ends of the beams are connected through the connectors with end portions of the regular polygon of the movable electrode that are remote from the supporters to which the ends of the beams are connected, respectively, whereby the lengths of the beams can be lengthened in accordance with the length of the sides of the regular polygon. Therefore, the sensor of the invention can be constructed as a semiconductor capacitive acceleration sensor which is miniaturized, which has a high detection sensitivity, and in which the detection output characteristic is linear.

In a sensor wherein electrostatic capacities respectively change in manners contradictory to each other, one stationary electrode is disposed so as to be separated from the lower face of the movable electrode by a predetermined distance, and another stationary electrode is similarly disposed so as to be separated from the whole of the upper face of the movable electrode by a predetermined distance. Consequently, the area of the one stationary electrode can be made substantially equal to that of the other stationary electrode.

In the semiconductor capacitive acceleration sensors, moreover, the movable electrode is provided with a weight. Accordingly, the amount of the movement of the movable electrode due to acceleration is increased so that the detection sensitivity is further improved.

BRIEF DESCRIPTION OF THE DRAWINGS

FIG. 1A is a plan view, FIG. 1B is a sectional view along the line A—A of FIG. 1A, and FIG. 1C is a sectional view along the line B—B of FIG. 1A.

FIG. 2A is a plan view, FIG. 2B is a sectional view along the line A—A of FIG. 2A, and FIG. 2C is a sectional view along the line B—B of FIG. 2A.

FIG. 3A is a plan view, FIG. 3B is a sectional view along the line A—A of FIG. 3A, and FIG. 3C is a sectional view along the line B—B of FIG. 3A.

FIG. 4A is a plan view, FIG. 4B is a sectional view along the line A—A of FIG. 4A, and FIG. 4C is a sectional view along the line B—B of FIG. 4A.

DETAILED DESCRIPTION OF PREFERRED EMBODIMENTS

Figure 1A:
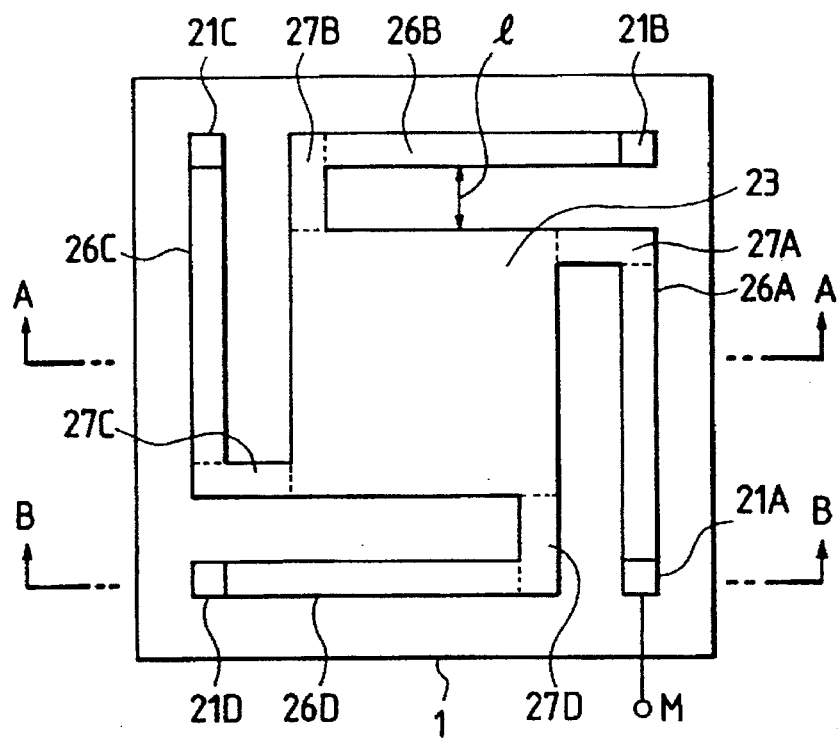
FIGS. 1A to 1C show a first embodiment of the semiconductor capacitive acceleration sensor of the invention.
Figure 1B:
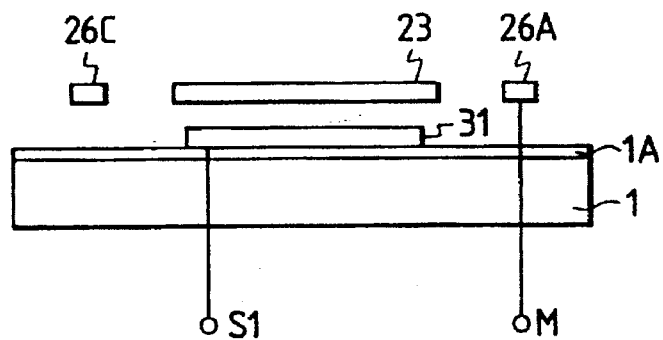
Figure 1C:
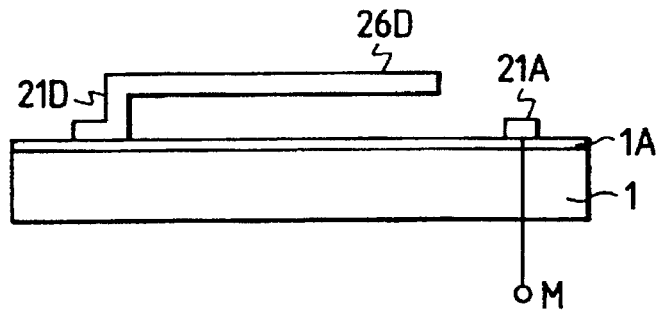

First Embodiment:

FIGS. 1A to 1C shows an embodiment of the semiconductor capacitive acceleration sensor of the invention. FIG. 1A is a plan view, FIG. 1B is a sectional view along the line A—A of FIG. 1A, and FIG. 1C is a sectional view along the line B—B of FIG. 1A. The sensor comprises: a semiconductor substrate 1; supporters 21A to 21D each of which is made of polysilicon, and which are disposed on the upper face of the semiconductor substrate 1 through an insulating layer 1A so as to be placed at positions corresponding to corners of a quadrilateral; beams 26A to 26D which respectively have ends connected with the supporters 21A to 21D, which coincide with each other when the beams are rotated by 90°, and which respectively elongate in the side directions of the quadrilateral; a movable electrode 23 which is disposed so as to be separated from the beams 26A to 26D by a predetermined distance ι; connectors 27A to 27D which respectively connect the movable electrode 23 with the other ends of the beams 26A to 26D; and a stationary electrode 31 which is disposed on the upper face of the silicon substrate 1 through the insulating layer 1A, so as to be separated from the lower face of the movable electrode 23 by a predetermined distance. A terminal M is drawn out from the movable electrode 23 through the connector 27A, the beam 26A and the supporter 21A, and a terminal $S_1$ from the stationary electrode 31.

The semiconductor capacitive acceleration sensor operates in the following manner: When acceleration is applied to the movable electrode 23 in the vertical direction, the movable electrode 23 receives a force in the vertical direction to be moved vertically. For example, the vertical movement of the movable electrode 23 causes the distance between the movable electrode 23 and the stationary electrode 31 to be reduced, thereby increasing the electrostatic capacity between the electrodes. The value of the electrostatic capacity is obtained through the terminals M and $S_1$, and then subjected to a signal processing by a differential amplifier, etc., thereby detecting the applied acceleration.

In the semiconductor capacitive acceleration sensor, the movable electrode 23 has a quadrilateral shape, and is uniformly supported at the periphery by the beams 26A to 26D which are respectively disposed in parallel to the sides of the quadrilateral with being separated therefrom by the predetermined distance ι. When acceleration is applied in the vertical direction, the movable electrode 23 is vertically moved with respect to the stationary electrode 31. Since the other ends of the beams are respectively connected through the connectors with end portions of the regular polygon of the movable electrode 23 that are remote from the ends of the beams with which the supporters are connected (the state shown in FIG. 1), the lengths of the beams can be lengthened in accordance with the length of the sides of the regular polygon. Therefore, the sensor can be constructed as a semiconductor capacitive acceleration sensor which is miniaturized, which has a high detection sensitivity, and in which the detection output characteristic is linear.

Figure 2A:
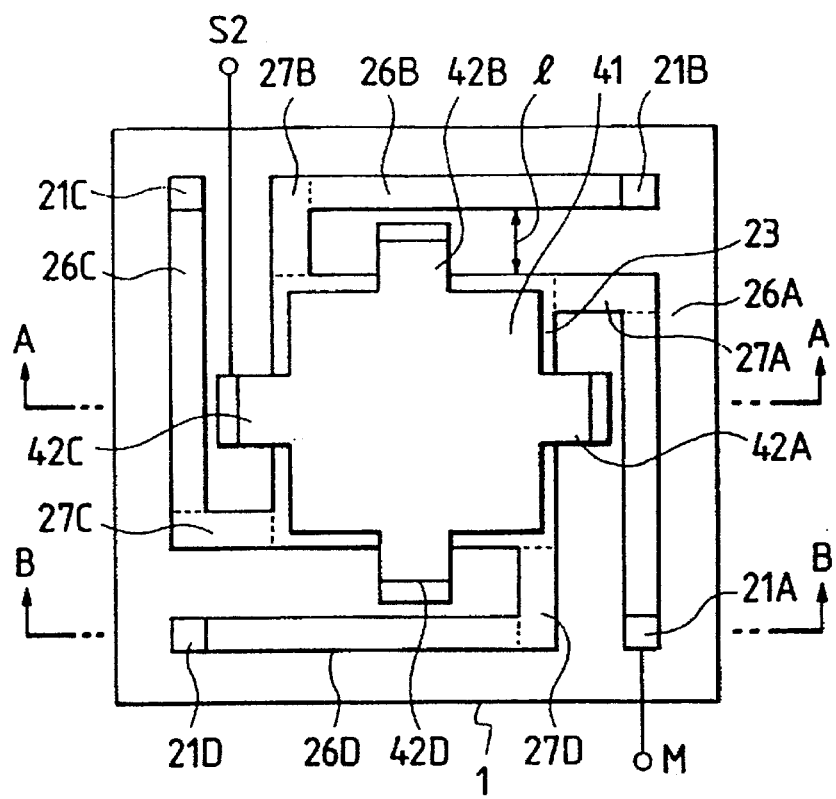
FIGS. 2A to 2C show another embodiment of the semiconductor capacitive acceleration sensor of the invention.
Figure 2B:
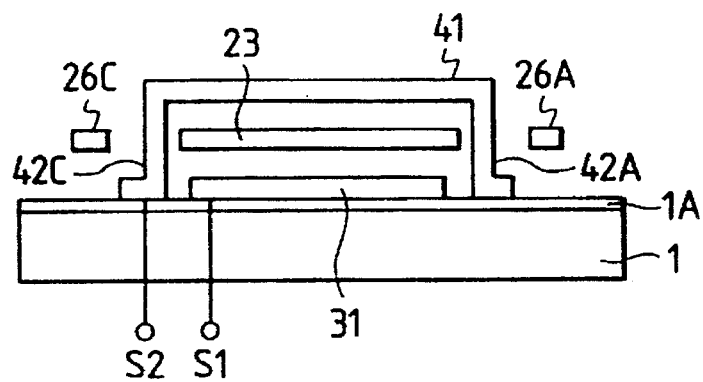
Figure 2C:
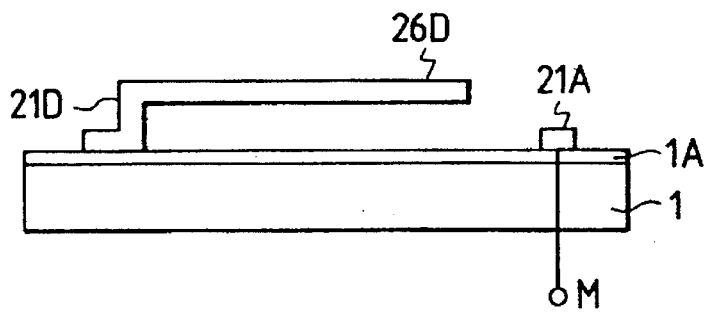

Second Embodiment:

FIGS. 2A to 2C show a second embodiment of the semiconductor capacitive acceleration sensor of the invention. FIG. 2A is a plan view, FIG. 2B is a sectional view along the line A—A of FIG. 2A, and FIG. 2C is a sectional view along the line B—B of FIG. 2A. In addition to the components shown in FIG. 1, the sensor of FIG. 2 further comprises supporters 42A to 42D which are disposed on the upper face of the silicon substrate 1 through the insulating layer 1A, and a stationary electrode 41 which is connected at the periphery with the supporters 42A to 42D, and which is disposed so as to be separated from the upper face of the movable electrode 23 by a predetermined distance. A terminal $S_2$ is drawn out from the stationary electrode 41 through the supporter 42C.

The semiconductor capacitive acceleration sensor operates in the following manner: When acceleration is applied to the movable electrode 23 in the vertical direction, for example, the distance between the movable electrode 23 and the stationary electrode 31 to be reduced, thereby increasing the electrostatic capacity between the electrodes, and, in contrast, the distance between the movable electrode 23 and the stationary electrode 41 to be increased, thereby decreasing the electrostatic capacity between the electrodes. The values of these electrostatic capacities are respectively obtained through the terminals M and $S_1$, and M and $S_2$, and then subjected to a signal processing by a differential amplifier or the like, thereby detecting the applied acceleration.

The semiconductor capacitive acceleration sensor detects the electrostatic capacities which are respectively produced between the movable electrode 23 and the stationary electrode 31, and the movable electrode 23 and the stationary electrode 41, and which respectively change in manners contradictory to each other. Therefore, the detection sensitivity is further improved. Since the stationary electrode 41 is disposed so as to oppose the whole of the upper face of the movable electrode, the areas of the stationary electrodes 31 and 41 can be made substantially equal to each other. Accordingly, the values (absolute values) of the electrostatic capacities between the stationary electrodes 31 and 41 and the movable electrode 23 are substantially equal to each other, so that, for example, the circuit of the differential amplifier can be simplified to reduce the production cost.

Figure 3A:
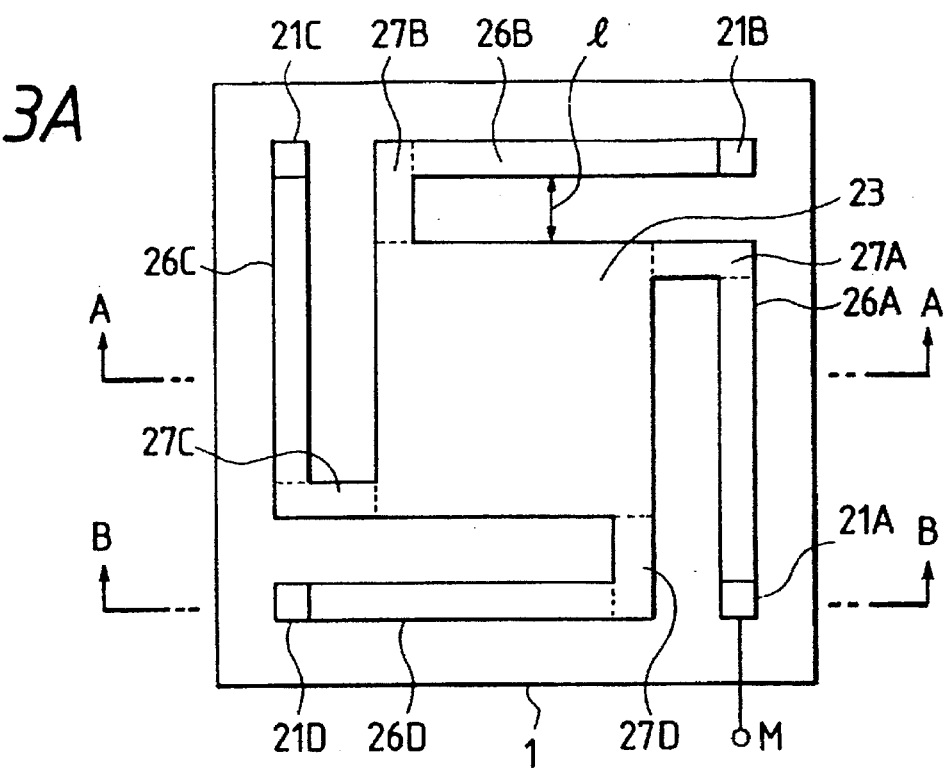
FIGS. 3A to 3C show a third embodiment of the semiconductor capacitive acceleration sensor of the invention.
Figure 3B:
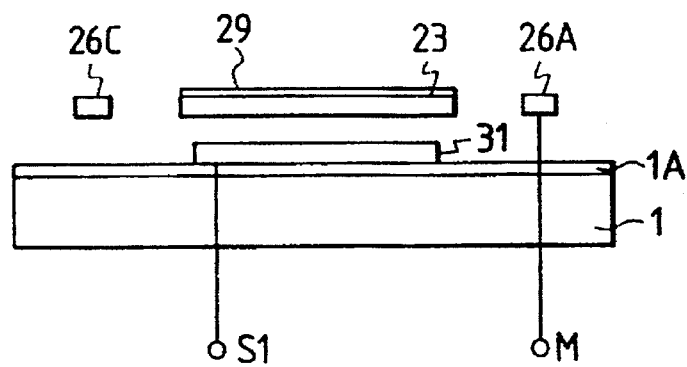
Figure 3C:
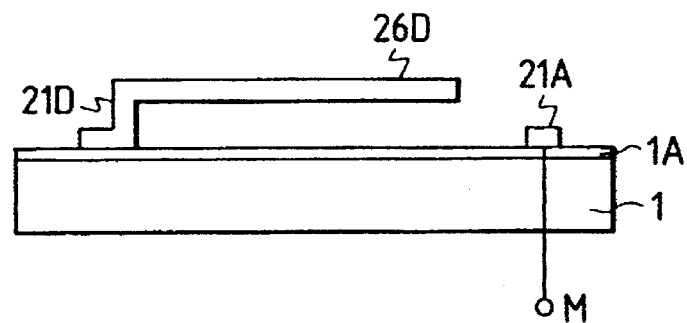
Figure 4A:
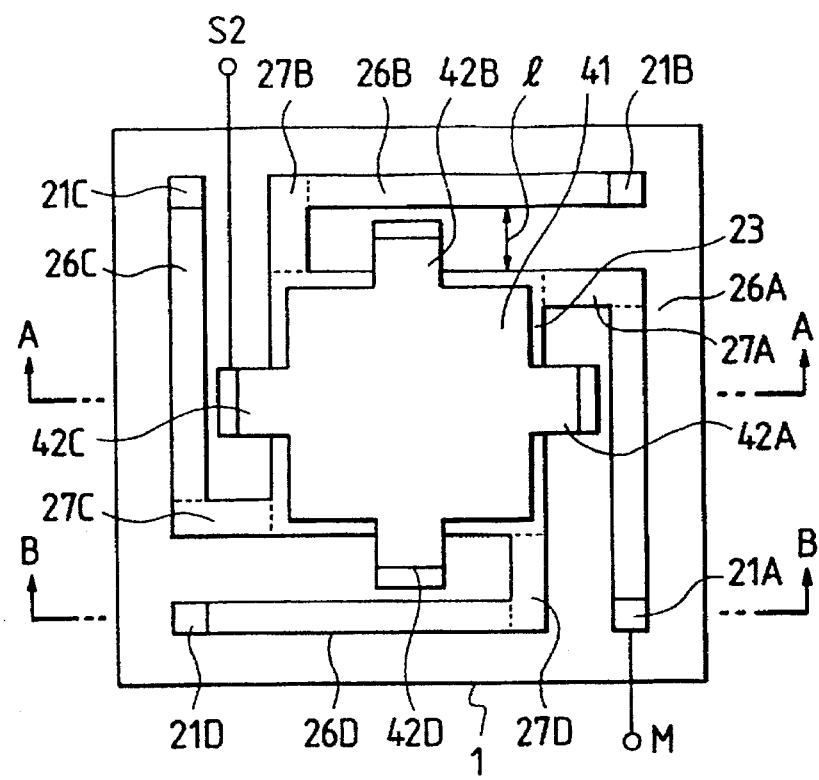
FIGS. 4A to 4C show a fourth embodiment of the semiconductor capacitive acceleration sensor of the invention.
Figure 4B:
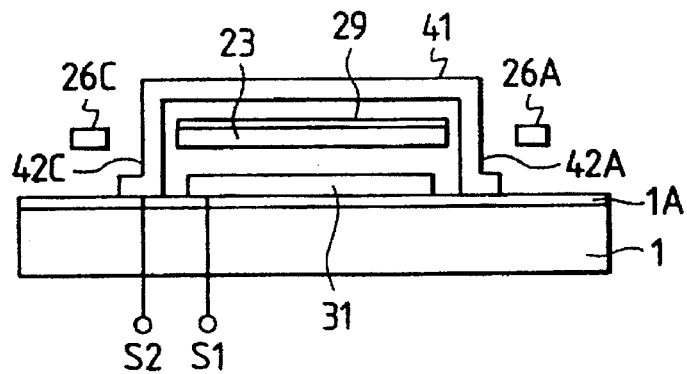
Figure 4C:
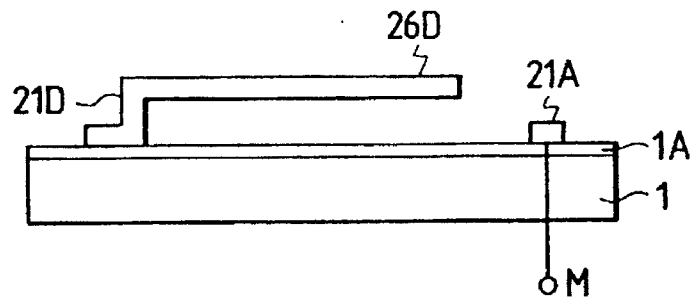
Figure 5:
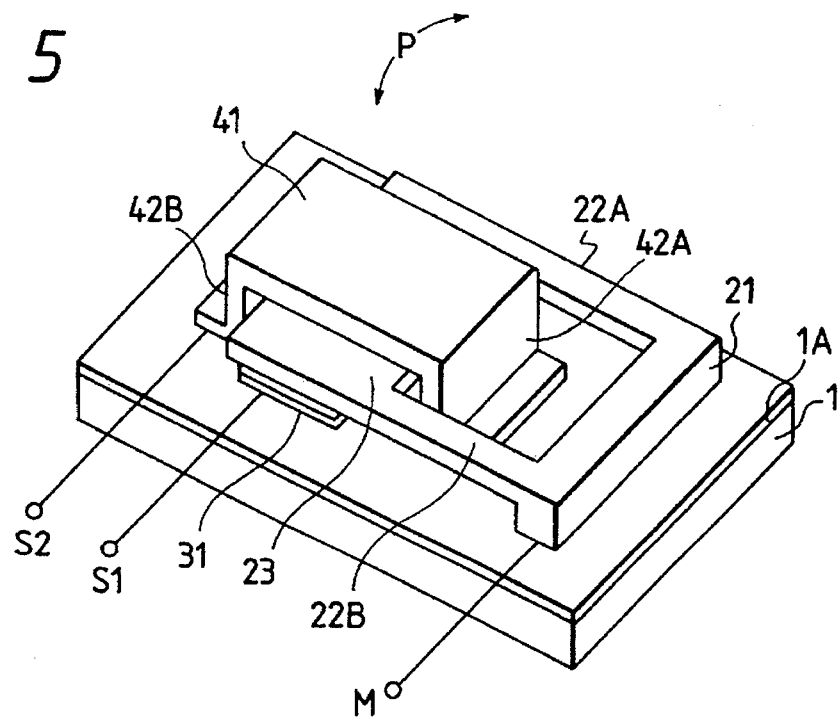
FIG. 5 is a perspective view showing an example of a conventional semiconductor capacitive acceleration sensor.
Figure 6:
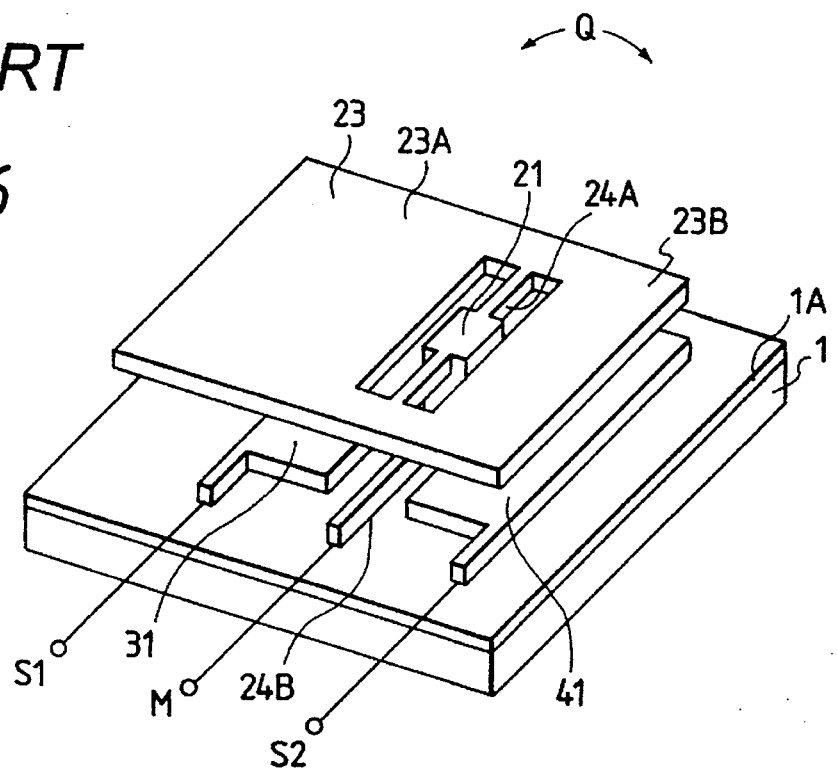
FIG. 6 is a perspective view showing another example of a conventional semiconductor capacitive acceleration sensor.
Figure 7:
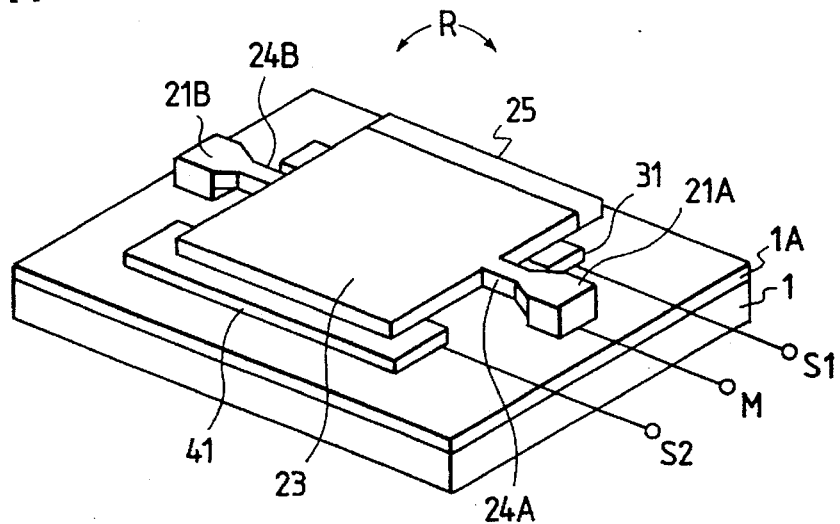
FIG. 7 is a perspective view showing a further example of a conventional semiconductor capacitive acceleration sensor.
Figure 8A:
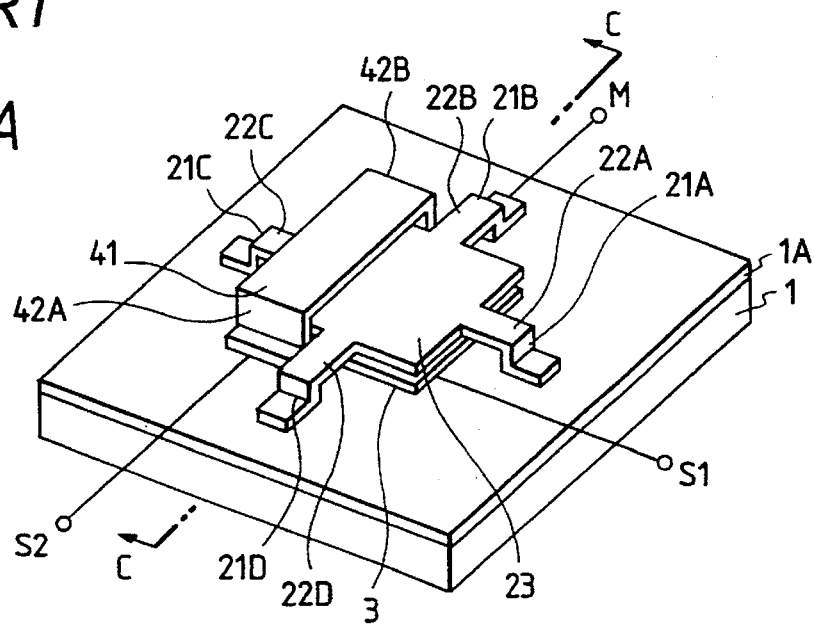
FIGS. 8A is a perspective view showing a still further example of a conventional semiconductor capacitive acceleration sensor.
Figure 8B:
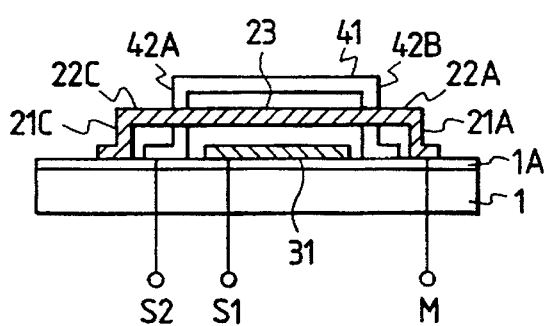
FIG. 8B is a sectional view along the line C—C of FIG. 8A.

FIGS. 3A to 3C and 4A to 4C show further embodiments of the semiconductor capacitive acceleration sensor of the invention. In the figures, FIGS. 3A and 4A are plan views, FIGS. 3B and 4B are sectional views along the line A—A of FIGS. 3A and 4A, and FIGS. 3C and 4C are sectional views along the line B—B of FIGS. 3A and 4A. These embodiments are respectively obtained by modifying the sensors of FIGS. 1 and 2 so that a metal film 29 is attached to the movable electrode 23. The provision of the metal film 29 increases the weight of the movable electrode 23, and hence the detection sensitivity of each sensor is further improved. Since a metal has a large specific gravity, the provision of the metal film 29 hardly causes the movable electrode portion to be enlarged. However, it is a matter of course that the gap between the movable electrode 23 and the stationary electrode 41 is corrected considering the thickness of the metal film 29.

The semiconductor capacitive acceleration sensor of the invention has a small size, and a high detection sensitivity, and a linear detection output characteristic. Therefore, the sensor is preferably used in various purposes including an automobile. In a sensor wherein electrostatic capacities for detecting acceleration respectively change in manners contradictory to each other, moreover, the values (absolute values) of the electrostatic capacities changing in manners contradictory to each other are equal to each other. Therefore, a circuit for processing signals, for example, a differential amplifier can be simplified so that the production cost is reduced.

What is claimed is:

1. A semiconductor capacitive acceleration sensor comprising:

a semiconductor substrate;

a plurality of supporters made of a conductive semiconductor and disposed on an upper face of said semiconductor substrate through an insulating layer, said supporters being placed at positions which correspond to corners of a regular polygon, respectively;

beams respectively connected with said supporters at one end, each of said beams extending along a side of the regular polygon from the one end to an opposite end, said beams being rotationally symmetrical about the center of the regular polygon;

a movable electrode located within the regular polygon and spaced from said beams;

connecting means for connecting said movable electrode with the opposite ends of said beams, respectively; and a stationary electrode disposed on said upper face of said semiconductor substrate through said insulating layer, said stationary electrode being separated from a lower face of said movable electrode by a predetermined distance.

2. A semiconductor capacitive acceleration sensor as claimed in claim 1, wherein a metal film is attached to said movable electrode.

3. A semiconductor capacitive acceleration sensor as claimed in claim 1, further comprising:

a first terminal electrically connected with said movable electrode through at least one of said connecting means, said beams and said supporters respectively, being connected to each other, and a second terminal electrically connected with said stationary electrode.

4. A semiconductor capacitive acceleration sensor comprising:

a semiconductor substrate;

a plurality of first supporters made of a conductive semiconductor and disposed on an upper face of said semiconductor substrate through an insulating layer, said first supporters being placed at positions which correspond to corners of a regular polygon, respectively;

beams respectively connected with said first supporters at one end, each of the beams extending along a side of the regular polygon from the one end to an opposite end, said beams being rotationally symmetrical about the center of the regular polygon;

a movable electrode located within the regular polygon and spaced from said beams;

connecting means for connecting said movable electrode with the opposite ends of said beams, respectively;

a first stationary electrode disposed on said upper face of said semiconductor substrate through said insulating layer, said first stationary electrode being separated from a lower face of said movable electrode by a predetermined distance;

a plurality of second supporters disposed on said upper face of said semiconductor substrate through said insulating layer, each of said second supporters being located between the movable electrode and a corresponding one of said beams; and a second stationary electrode connected at a periphery with said second supporters, and separated from an upper face of said movable electrode by a predetermined distance.

5. A semiconductor capacitive acceleration sensor as claimed in claim 4, wherein a metal film is attached to said movable electrode.

6. A semiconductor capacitive acceleration sensor as claimed in claim 4, further comprising:

a first terminal electrically connected with said movable electrode through at least one of said connecting means, said beams and said first supporters respectively being connected to each other;

a second terminal electrically connected with said first stationary electrode; and a third terminal drawn out from said second stationary electrode through said second supporters.

7. A semiconductor capacitive acceleration sensor as claimed in claim 6, wherein values of electrostatic capacities between said first and second terminals, and between said first and third terminals are obtained, said values being subjected to a signal processing by a differential amplifier.

8. A semiconductor capacitive acceleration sensor as claimed in claim 4, wherein said first and second stationary electrodes occupy areas substantially equal to each other.

9. A semiconductor capacitive acceleration sensor as claimed in claim 8, wherein the areas of said first and second stationary electrodes are substantially equal to an area occupied by said movable electrode.

10. A semiconductor capacitive acceleration sensor as claimed in claim 1, wherein the movable electrode has substantially the shape as the regular polygon.

11. A semiconductor capacitive acceleration sensor as claimed in claim 4, wherein the movable electrode has substantially the shape as the regular polygon.

* * * * *

UNITED STATES PATENT AND TRADEMARK OFFICE
CERTIFICATE OF CORRECTION

PATENT NO. : 5,665,915
DATED : September 09, 1997
INVENTOR(S) : Mitsuo Kobayashi et al.

It is certified that error appears in the above-identified patent and that said Letters Patent is hereby corrected as shown below:

Claim 4, Column 9, Line 39, ".movable" should read --movable--;

Signed and Sealed this

Twenty-second Day of September, 1998

Attest:

BRUCE LEHMAN

Attesting Officer

Commissioner of Patents and Trademarks